4 Sheets—Sheet 1.

J. BROWN.

Steam Heater.

No. 321. Reissued Aug. 14, 1855.

Witnesses:
Samuel W. Pezell
Chas. Smallwood

Inventor:
John Brown.

N. PETERS, Photo-Lithographer, Washington, D. C.

4 Sheets—Sheet 2.

J. BROWN.

Steam Heater.

No. 321.

Reissued Aug. 14, 1855.

Witnesses:

Samuel W. Krull.

Chas. Ch. Elliot.

Inventor:

John Brown.

N. PETERS, Photo-Lithographer, Washington, D. C.

4 Sheets—Sheet 3.

J. BROWN.

Steam Heater.

No. 321.

Reissued Aug. 14, 1855.

Witnesses:
Samuel W. Shrull
Charles Senallient.

Inventor:
John Brown

N. PETERS, Photo-Lithographer, Washington, D. C.

4 Sheets—Sheet 4.
J. BROWN.
Steam Heater.
No. 321.
Reissued Aug. 14, 1855.
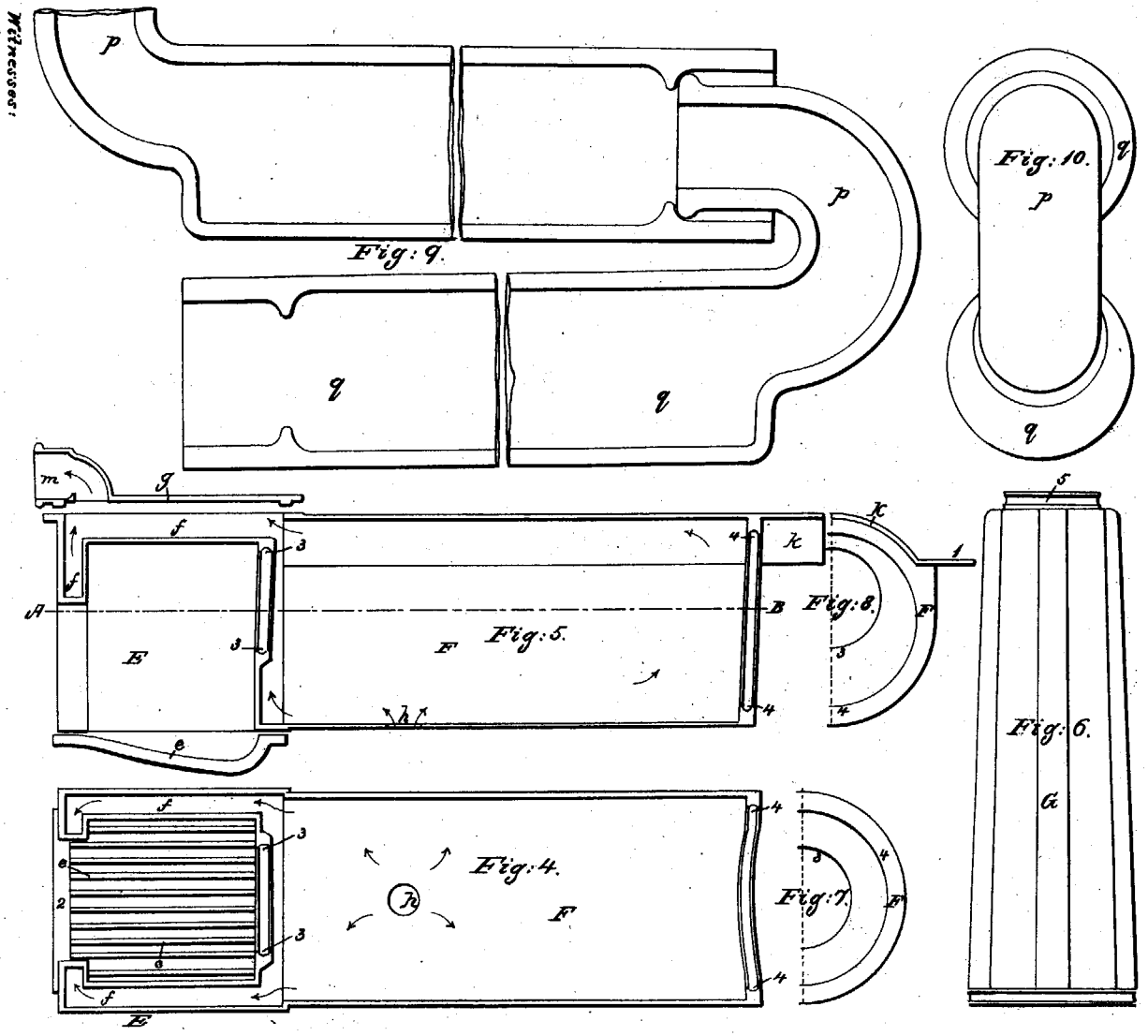
Witnesses:
Lewis W. Grell
Chas. Leathet
Inventor:
John Brown
N. PETERS, Photo-Lithographer, Washington, D. C.

UNITED STATES PATENT OFFICE.

JOHN BROWN, OF NEW YORK, N. Y.

IMPROVEMENT IN HOT-WATER APPARATUS.

Specification forming part of Letters Patent No. 10,982, dated May 30, 1854; Reissue No. 321, dated August 14, 1855.

*To all whom it may concern:*

Be it known that I, JOHN BROWN, of the city, county, and State of New York, manufacturer of apparatus for warming buildings, have invented, made, and applied to use certain new and useful Improvements in Apparatus for Warming by Circulating Hot Water; and I do hereby declare that the following is a full, clear, and exact description of the construction, operation, and effect of the same, reference being had to the annexed drawings, making part of this specification, wherein—

Figure 1:
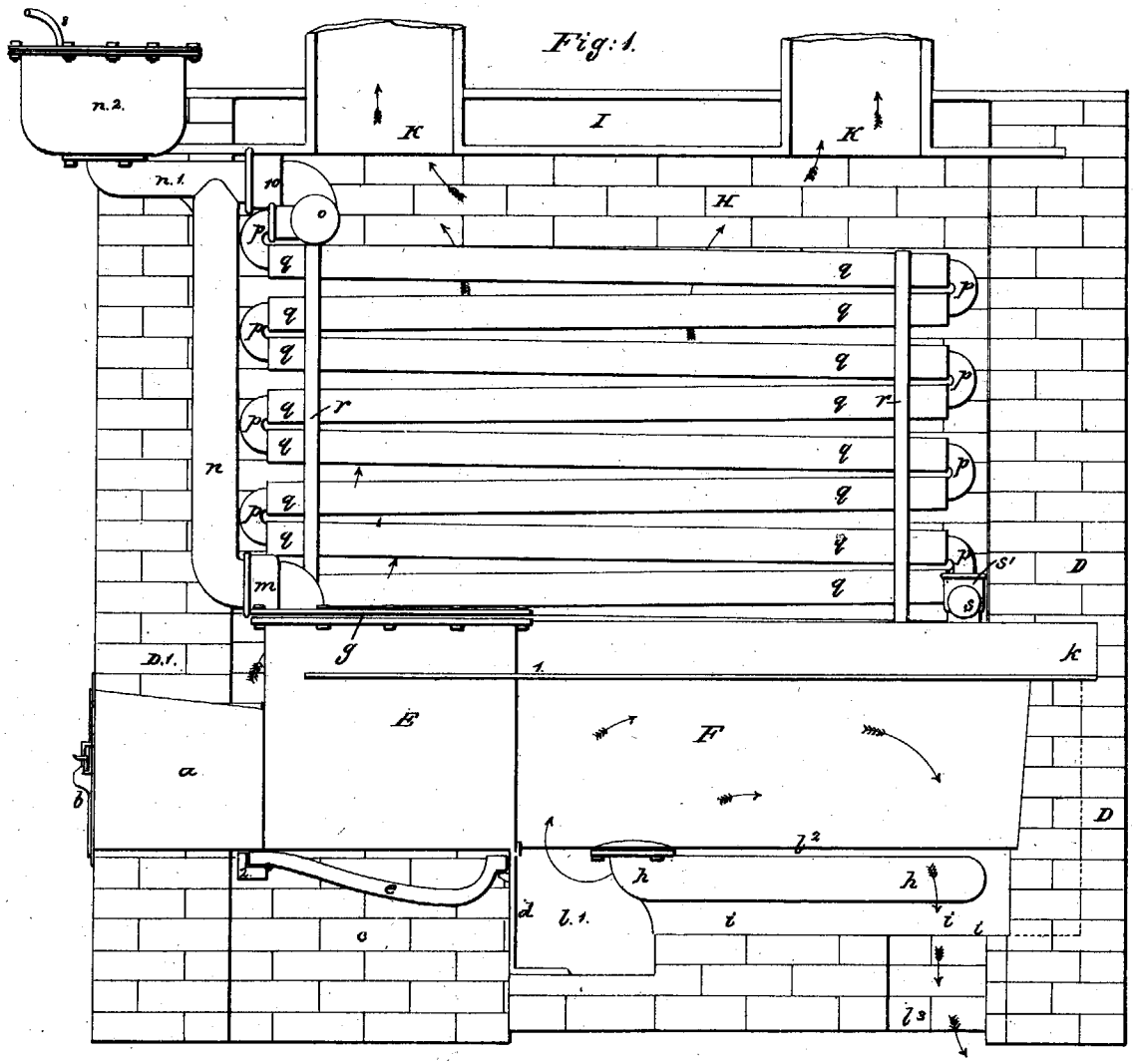
Figure 2:
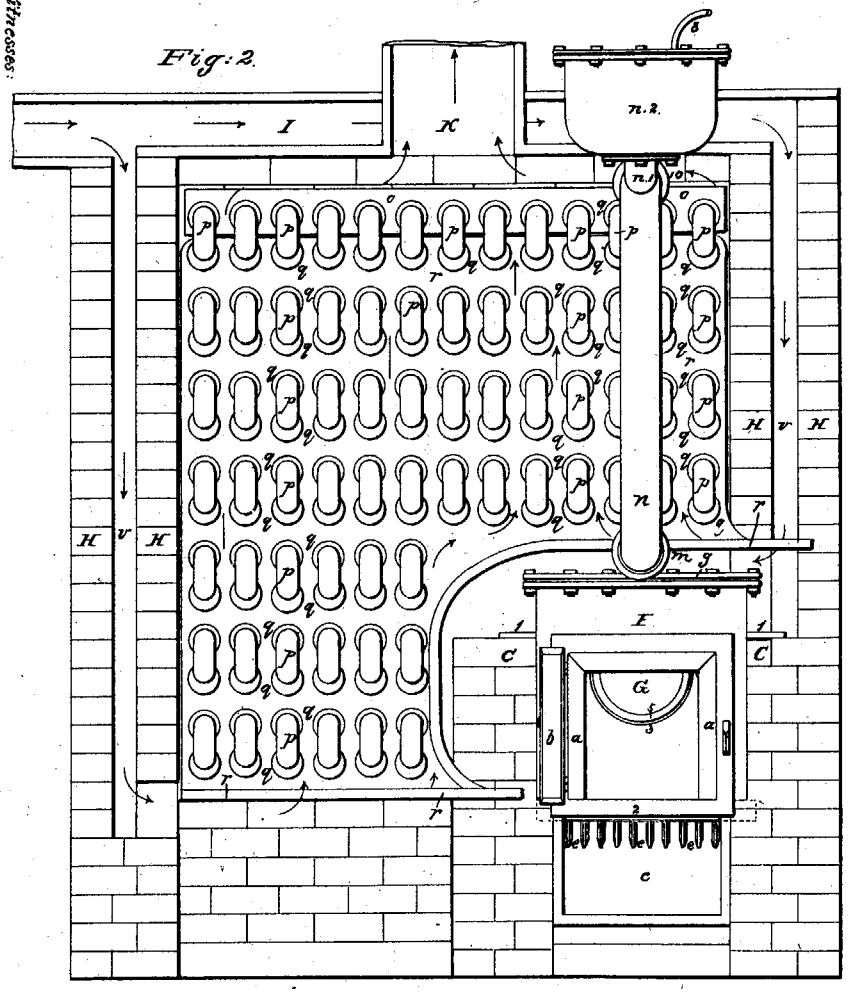
Figure 3:
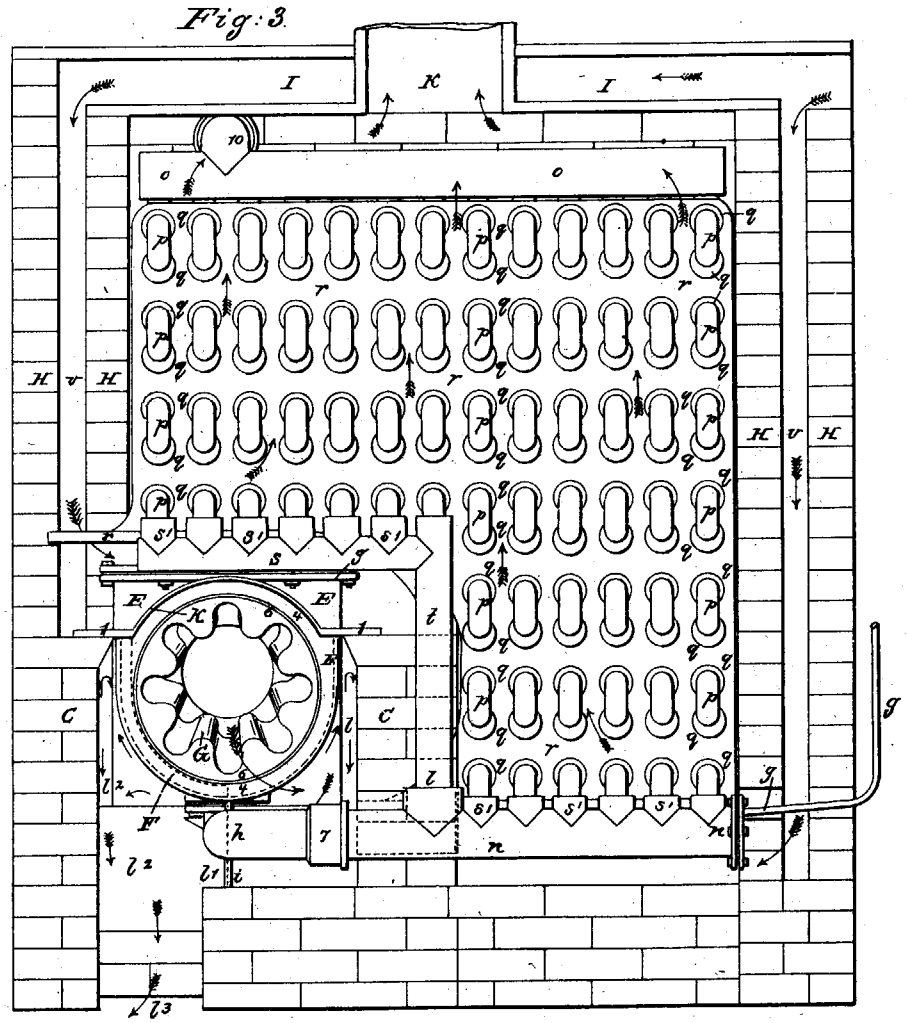

Figure 1 is a side view of the apparatus with the inclosing-wall removed. Fig. 2, Sheet 2, is an elevation of the front end with the wall removed. Fig. 3, Sheet 3, is a like elevation of the back end of the apparatus. Sheet 4: Fig. 4 is a plan in section of the boiler and furnace, with the horizontal flue removed, as through line A B of Fig. 5, which is a like sectional elevation. Fig. 6 is an elevation of the corrugated flue in the boiler. Fig. 7 is an elevation of the lower half of the boiler on the end opposite the furnace. Fig. 8 is an elevation of half of the boiler at the back end. Figs. 9 and 10 show the manner in which the slightly-inclined circulating-pipes are connected at their highest ends to the next range of pipes above.

The like marks of reference denote the same parts in all the figures.

A proper foundation of masonry or brick-work is prepared, on which two walls, C C, are built parallel to each other, and of a height to receive the side flanges, 1 1, of and supporting the furnace E and boiler F.

D is the back wall of the apparatus, and D′ is the front wall, having a chute, *a*, with a door *b*, through which the fuel is supplied to the furnace.

*c* is an ash pit beneath the furnace, with a dividing-plate, *d*, at the back end, on which is a rib sustaining this end of the grate-bars *e*, the front ends of which rest on a cross-bar, 2.

The furnace and boiler are to be cast together, there being no pressure but the hydrostatic weight of water, and the case of the furnace is made double to form a water-space, *f*, through which is an opening corresponding with the chute *a*. The division between the furnace and boiler is formed with a circular opening, 3, with a groove or recess formed in the metal around the opening, as seen in Figs. 4 and 5. The boiler itself is round, except where it is slightly flattened (see Fig. 3) to join the flanges 1, and the back end of the boiler is formed with a circular opening, 4, similar to the opening 3. These openings 3 and 4 receive a circular tapering flue, G, (see Figs. 3 and 6,) which may be either plain or corrugated, in the manner shown. The smaller end of this flue is made with a short neck, 5, grooved on its circumference to correspond with the groove in the opening 3, and with a flange or collar, 6, at the larger end corresponding with and fitted to the opening 4. The joints thus made are to be filled or packed with proper cement. It will be seen that by fitting in this flue as shown its upper side is parallel, or nearly so, with the top of the boiler, and a large surface for heating the water is obtained, whereas if a flue were fitted in on the line of the axis of the boiler the grate-bars and fire-door would have to be lower down to prevent the coal from being thrown into the flue, whereas by inclining the conical flue upward the same is fitted in as compactly and simply as possible; and by the construction of the joints as represented a simple and permanent arrangement is obtained at a very little cost of construction and fitting.

Beneath the boiler is a pipe, *h*, connected by a flange and bolts running lengthwise of the boiler, and then bending horizontally, terminating with a socket, 7. (See Fig. 3.)

*i* is a division-plate cast with the pipe *h*, and resting on the foundation. (See Figs. 1 and 3.)

The top plate of the boiler at the back end extends beyond the end of the boiler, as at *k*, and, with the flanges 1, forms a connection with the brick-work, which at this end is set off from the boiler sufficient to form a flue within the back wall, D, and the inner wall, *c*, the wall at the outer angle being built so as to connect with one side of the boiler, as shown by dotted lines in Fig. 3. The products of combustion from the fire thus pass through the corrugated flue G within the boiler into the flue *l*, between the boiler and wall C, crossing under the boiler at $l'$, returning along between the sides of the boiler and the outer supporting-wall, C, in the flue $l^2$, and is finally led off by a descending flue $l^3$ to any proper chimney. Thus the heat is compelled to travel a long distance and operate on a large amount of surface, and at the same time the part of the furnace and boiler above the flanges 1 is radiating heat into the receptacle for warm air.

*g* is a cover bolted onto the top of the furnace E, on which is a socket, *m*, to receive the lower end of the vertical pipe *n*, on the upper end of which is a branch pipe, *n'*, to the under side of the expansion and steam box $n^2$. This box has a small pipe, 8, by which any steam that may be formed is led away, and another pipe, 9, connects the circulating-pipe *u* (see Fig. 3) with any suitable reservoir at the proper level, in which a ball and cock supplies any evaporation or leakage.

The pipe *n* is connected to a cross-pipe, *o*, by a socket, 10. This pipe *o* is supported by the vertical plate or frame *r*, and has thimbles to receive return bends *p* of the pipes *q*, which pipes *q* lie nearly horizontal, supported by the frames *r*, the end connecting with the next pipe above, being placed slightly higher than the other end to allow the escape of air. These pipes *q* are set in vertical ranges or tiers in the frames *r*, so that the water in the apparatus, being heated in the boiler, ascends through the pipe *n* into the cross-pipe *o*, and then circulates back and forth through the ranges of pipes, descending as it cools, and being returned to the boiler by the pipes *s*, *u*, and *h*. The pipes *s* and *u* have thimbles *s'* connecting to the ends of the horizontal pipes, and the pipe *s* which is over the back end of the boiler is connected by a vertical pipe, *t*, to the pipe *u*, which passes through the inner wall, C.

The side walls, H, inclosing the apparatus, are made hollow to form air-passages *v*, and the covering of the apparatus is also to be made hollow, as at I, through which are the openings K, connecting with the interior of the apparatus for the heated air to pass off, as usual. And I would here remark that the general arrangement of the pipes *q*, *s*, *t*, and *u* is old, and the operation of the heat in the pipes and the circulation of the air is so well known and understood as to need no further explanation.

The objects to be attained in the construction of apparatus for heating by the circulation of hot water are to obtain the greatest extent of heating-surface within a given space to attain this without checking the circulation of the water in the apparatus, and to reduce the original cost and the liability to derangement, and at the same time to facilitate repairs.

Heretofore the pipes through which the hot water circulates from and back to the boiler have been arranged in vertical tiers, the several pipes of each tier being slightly inclined, and alternately in opposite directions, with the ends nearest together connected by a semicircular bend or elbow, that the water may pass from the one to the other; and the mode of connection of these elbows with the pipes has been heretofore made by flange and bolt joint, either from the want of a better mode of connection or from the belief that unless the connecting-elbows are of a size to present an equal area of cross-section with the pipes which they connect the circulation will be impeded. This mode of connection presents serious objections. In the first place, the pipes cannot be placed close together on account of the projection of the flanges, from which it follows that the extent of pipe or heating surface is much less for the space occupied by the apparatus than if the pipes could be placed nearer; and, secondly, they cannot be taken out and inserted with facility either in the original construction or for repairs on account of the projection of the flanges beyond the diameter of the pipes. These difficulties I have avoided by my invention, which consists in making the connecting bends or elbows of smaller size to fit into the end of one or both pipes. By this means I am enabled to form the connection without any enlargement of the end or ends of the pipes, so that they can be inserted in the holes of the sustaining-plates and taken out for repairs and reinserted, which could not be done if made with projecting flanges or other enlargement at both ends, and by which also I am enabled to place the pipes so near as to touch, if desired; and the circulation will not be impeded by the fact of making the cross-section of the elbows of less area than the cross section of the pipes so long as the aggregate of the area presented by the cross-section of all the elbows at one end of one horizontal range of pipes be more than equal to the area of the cross-section of the main ascending-pipe *n*.

And all tendency to check the circulation of the water by the accumulation of air at the junction of the elbows or bends with the ends of the pipes by reason of making the former of less diameter than the latter is entirely obviated by the second part of my invention, which consists in making each pipe with the bend or elbow of less diameter, cast with or otherwise attached to one end thereof, with the bore or caliber of the two in the same line at top and fitting the open end of such bend or elbow into the open end of the next pipe above. In this case each pipe has one end without any projection, so that it can be readily inserted into and through the supporting-plates *r*, and there will be no offset or projection for the accumulation of air along the upper surface of the lower pipe at its junction with the elbow or bend; neither is there any obstruction to the free passage of air out of the apparatus by reason of the offset for the joint, because the same is at the lowest end of the pipe.

And, although I prefer to construct the pipes, as represented at Figs. 9 and 10, by casting the elbow *p* with and on one end of each pipe *q*, and on a level with the upper surface, nevertheless it will be obvious that the elbow and the pipe may be made separately, and afterward united, and still have the caliber of the elbow bear the same relation with the caliber of the pipe.

And, again, it will be obvious that if it be desired to apply the first part of my invention without the second the elbow or bend may be secured to the end of the pipe with the calibers concentric; but in that case air will accumulate in the upper part of the pipe.

It will be evident that by the construction and arrangement of the boiler herein set forth with the inclined flue G the advantage is obtained of giving the requisite amount of depth below the opening into the flue G for the fire without having to raise the whole boiler, as would be the case if the axis of the flue G were horizontal, and by the arrangement of the water box and pipes the water does not all circulate through the box, but the box merely receives the bubbles of steam and supplies any evaporation or leakage, keeping the requisite hydrostatic pressure in the pipes to consolidate the column of water, so that the same will circulate freely.

What I claim as my invention, and desire to secure by Letters Patent, is—

1. Connecting the ends of the horizontal or nearly horizontal water-pipes of hot water warming apparatus by means of return bends or elbows of less caliber, and entering within the end or ends of such pipe or pipes, substantially as and for the purpose specified.

2. Making each horizontal or nearly horizontal pipe having the bend or elbow at one end of reduced caliber, with the calibers at top in the same line, substantially as and for the purposes specified, whether made in one piece or the bend or elbow separate and then united, the said elbow being connected with the next pipe above it by entering the end thereof, substantially as and for the purposes specified.

3. The construction and arrangement of the apparatus for the purposes and substantially as specified.

In witness whereof I have hereunto set my signature this 5th day of June, 1855.

JOHN BROWN.

Witnesses:

LEMUEL W. SERRELL,
THOMAS G. HARROLD.